No. 810,246. PATENTED JAN. 16, 1906.
L. C. ANDERSON.
WEATHER BOARD GAGE.
APPLICATION FILED MAR. 13, 1905.
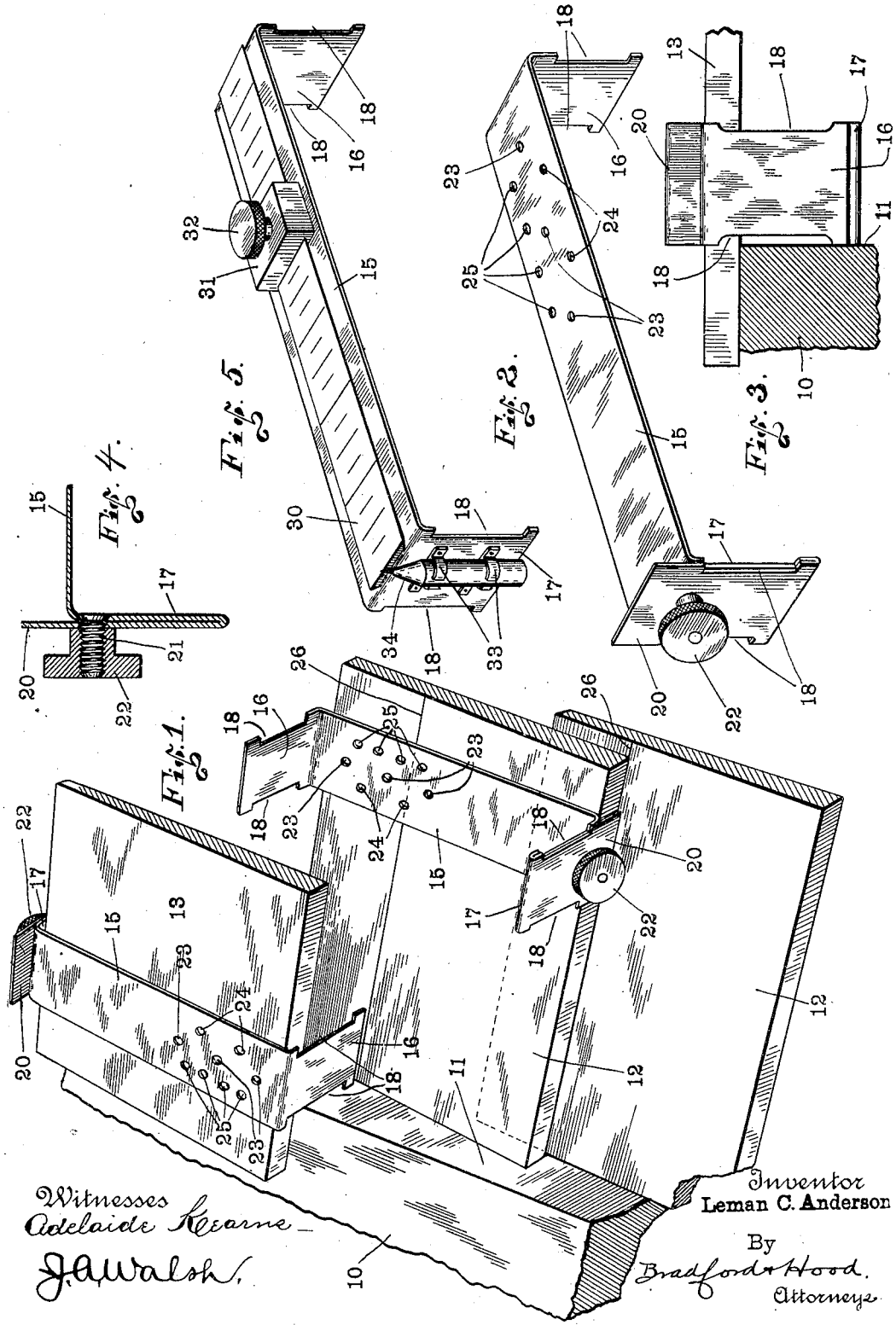

UNITED STATES PATENT OFFICE.

LEMAN C. ANDERSON, OF INDIANAPOLIS, INDIANA.

WEATHER-BOARD GAGE.

No. 810,246.			Specification of Letters Patent.			Patented Jan. 16, 1906.

Application filed March 13, 1905. Serial No. 249,902.

*To all whom it may concern:*

Be it known that I, LEMAN C. ANDERSON, a citizen of the United States, residing at Indianapolis, in the county of Marion and State of Indiana, have invented certain new and useful Improvements in Weather-Board Gages, of which the following is a specification.

In applying weather-boards to houses it is necessary that each piece of weather-board be marked in order to indicate the point to which the overlapping board is to be brought, and it is also necessary to cut each piece of weather-boarding accurately to such length that it will fit closely against the corner-finishing pieces of the house-frame. The corner-finishing pieces are generally of somewhat greater thickness than the combined thickness of the weather-boarding, and the inner faces of these corner-finishing pieces are often winding and undercut, so that difficulty is experienced in accurately determining the distance between adjacent faces of two corner-finishing pieces at the exact point at which a particular piece of weather-boarding is to be laid. The usual method of gaging the length of each weather-board is by means of a U-shaped wooden clip which is adapted to be slipped over the weather-board; but with this construction the outer arm of the clip, which lies on the outside of the weather-board and which serves as a guide for the marking knife or tool, is in alinement with the outer portion of the inner face of the finishing-strip, and hence does not give an accurate indication of the position of that portion of the inner face of the finishing-strip against which the end of the particular weather-board is to abut.

The object of my present invention is to provide a simple and efficient permanent tool by means of which the operator may accurately gage the length of the weather-board necessary to fit closely at the particular point to which the board is to be brought.

A further object of my invention is to combine with such a tool means by which each board may be marked to indicate the point of overlapping for a succeeding board.

The accompanying drawings illustrate my invention.

Figure 1 is a perspective view showing one form of my improved tool in two positions, that at the upper left-hand corner of the view indicating the position of use in gaging the length of a weather-board about to be laid and that at the right of the figure showing the manner of use for marking a weather-board to indicate the position of overlap. Fig. 2 is a perspective view of that form of the tool shown in Fig. 1; Fig. 3, a detail view showing the manner of use in gaging the length of a weather-board; Fig. 4, a sectional detail of the form of tool shown in the preceding figures, and Fig. 5 a perspective view of a modification of the overlap-marking portion of the tool.

In the drawings, 10 indicates a corner-finishing strip, and 11 the inner face thereof; 12, weather-boards which have been laid in position, and 13 the next board to be laid.

My tool consists of a main body portion 15 and a pair of downturned ends 16 and 17. In the preferred form both edges of the body 15 and the downturned ends 16 and 17 are carefully trued, so that either edge of the body 15 may be used as a knife-guide in marking the board 13, thus making it possible to mark both ends of the board without reversing the tool. It is to be understood, however, that the tool will be nearly as efficient with only a single edge arranged for this purpose. In order that the edges of the downturned ends 16 and 17 may be brought into contact with the face 11 of a corner-strip 10 at the exact point against which the board to be laid is to abut, these downturned ends are made of the desired length, and the intermediate portions of their edges are cut away, as at 18, so as to leave at their outer ends only portions which are in alinement with the corresponding edge of the body 15. By this means it becomes wholly immaterial whether the inner face 11 of a corner-strip 10 at the point against which the new board is to abut is overhung by the outer corner of the finishing-strip or lies within said corner, as the ends of the downturned portions 16 and 17 will engage the particular portion of the inner face 11 against which the end of the new board is to abut, so that when the operator lays a new board 13 upon the outer faces of the finishing-strips 10 and squares the board with the overlap-line to which the butt end of the board is to be brought and then lays the tool to the position shown in the upper left-hand corner of Fig. 1, with the tips of the downturned portion 16 and 17 against the inner face 11 of the finishing-strip 10, the corresponding edge of the body 15 will be in alinement with that portion of the inner face of the finishing-strip, and if the board 13 be marked at this line and cut as marked the board will accurately fit at the exact position to which it is to be brought.

In the form of the tool shown in Figs. 1 to 4, inclusive, I have shown perhaps the simplest form of combination for marking purposes. In this form the downturned portion 17 is doubled back upon itself so as to form a spring member 20, which projects above or beyond the outer face of the body 15. Passing through the two portions 17 and 20 is a threaded screw 21, upon which is threaded a thumb-nut 22, which nut engages the spring member 20 and holds it in any desired position.

Weather-boarding is laid from three to five inches to the weather, and in order to form a convenient means for marking each board I form through the body 15 a series of perforations 23, three, four, and five inches, respectively, from the normal position of the extended end of spring member 20. In another series, to one side of the series 23, I form perforations 24, which lie three and one-half and four and one-half inches from the member 20, and in another series I arrange perforations 25, which are arranged at the one-quarter-inch intermediate positions. All of these perforations might be arranged in one series, if desired; but the arrangement I have shown is probably the most convenient, for obvious reasons. If intermediate spacing is desired, these can be had by adjusting the thumb-nut 22, so that the member 20 will be moved from its normal position. In order to produce the overlap-mark 26 on any board, the operator has merely to reverse the tool to the position shown at the right of Fig. 1, placing the projecting portion of the member 20 against the butt edge of the weather-board—as, for instance, one of the laid portions 12—and then by placing a pencil in the desired perforation 23, 24, or 25 draw the tool and pencil together along the board.

It will be readily understood that the means for making the overlap-mark may be considerably varied, except that the inner face of the body 15 ought to be free from projecting obstructions. For instance, a construction such as shown in Fig. 5 may be employed, although such construction is considerably more expensive. In this figure I illustrate a tool the gaging portions of which are identical with the tool already described. The spring portion 20, screw 21, and nut 22 are omitted, and instead of the perforations through the body 15 I provide a gage-strip 30, secured to the outer face of the body 15 by riveting, brazing, or otherwise. This strip is provided with undercut edges, and slidably mounted upon said strip is an adjustable gage-head 31, held in any desired position by means of a thumb-screw 32. One of the downturned portions of the main body is then provided with pencil-holding clips 33, adapted to receive a pencil 34.

I claim as my invention—

1. A weather-board gage consisting of, a main body portion having a straight edge, and end pieces arranged at an angle to said body portion each with the end of an edge in the plane of the straight edge portion of the main body and an intermediate portion of said edge removed, an abutment carried by said tool and adapted to engage the edge of a weather-board, the said main body being provided with means by which a marking instrument may be maintained at a predetermined distance from said abutment.

2. A weather-board gage consisting of, a main body having downturned ends, said main body having its edges straight, and said downturned ends having intermediate portions of their edges removed and the ends of their edges in the plane of the corresponding straight edges of the main body, an abutment carried by said tool and adapted to engage the edge of a weather-board, the said main body being provided with means by which a marking instrument may be maintained at a predetermined distance from said abutment.

3. A weather-board gage consisting of, a main body, and end members arranged at an angle thereto, said end members each having at its end a transverse projecting portion in the plane of the straight edge of the main body portion, an abutment carried by said tool and adapted to engage the edge of a weather-board, the said main body being provided with means by which a marking instrument may be maintained at a predetermined distance from said abutment.

4. A weather-board gage consisting of, a main body having ends downturned from said body at an angle thereto and one of said ends doubled back upon itself to form a spring portion the end of which projects above the main body, and means for adjusting said spring portion toward and from the main body, the said main body having perforations formed through it and arranged at various distances from the projecting portion of the spring member, and the said downturned portions having intermediate portions of their edges removed, for the purpose set forth.

5. A weather-board gage consisting of, a main body having ends downturned therefrom at an angle thereto, the said downturned portions having intermediate portions of their edges removed, a lip carried by the main body at one end and projecting from the surface opposite to that from which the adjacent downturned end projects, the said main body having formed through it a plurality of perforations at various distances from said projecting lip, for the purposes set forth.

In witness whereof I have hereunto set my hand and seal, at Indianapolis, Indiana, this 8th day of March, A. D. 1905.

LEMAN C. ANDERSON. [L. S.]

Witnesses:
  ARTHUR M. HOOD,
  JAMES A. WALSH.